W. W. McKAY.
Horse Brush.

No. 84,837.  Patented Dec. 8, 1868.

Witnesses:
C. Raitig
Wm A. Morgan.

Inventor:
W. W. McKay
pr. Munn & Co
Attorneys

United States Patent Office.

W. W. McKAY, OF OSSIAN, IOWA.

*Letters Patent No. 84,837, dated December 8, 1868.*

IMPROVED ROTARY HORSE-BRUSH.

The Schedule referred to in these Letters Patent and making part of the same.

*To all whom it may concern:*

Be it known that I, W. W. McKay, of Ossian, in the county of Winneshiek, and State of Iowa, have invented a new and useful Improvement in Horse-Brushes; and I do hereby declare that the following is a full, clear, and exact description thereof, which will enable others skilled in the art to make and use the same, reference being had to the accompanying drawings, forming part of this specification.

This invention relates to improvements in horse-brushes, whereby it is designed to provide a rotating brush, to which motion may be readily communicated by hand, and so arranged as to admit of the substitution of one brush or comb for another readily.

In the accompanying drawings—

Similar letters of reference indicate corresponding parts.

Figure 1:
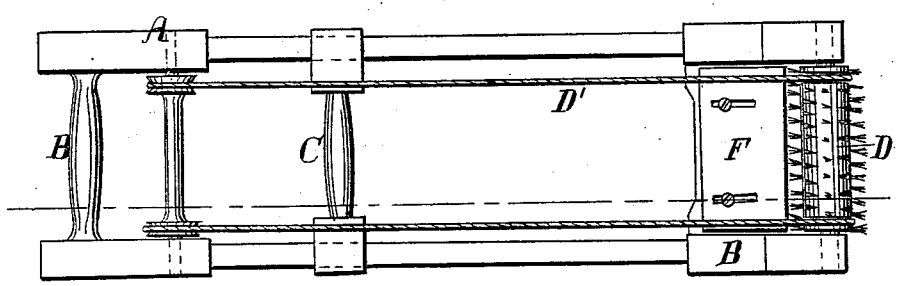
Figure 1 represents a plan view of my improved brush.
Figure 2:
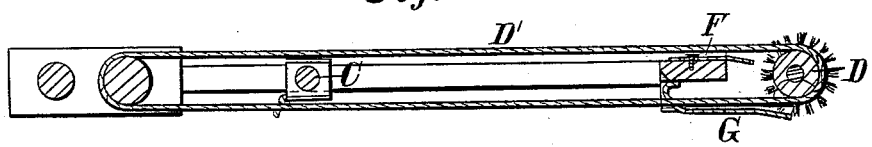
Figure 2 represents a longitudinal section of the same, on the line $x\ x$ of fig. 1.

A represents a supporting-frame, composed of two longitudinal bars, connected at or near the ends, by suitable transverse pieces B, between the ends.

The said longitudinal bars may be arranged in any suitable manner for carrying a slide, C.

In one end of the frame, a revolving brush, D, may be placed, by inserting the journals in bearings opening out to the ends of the supporting-bars, or in any other manner, to admit the brush to be readily put in or taken out.

The ends of the brush-cylinder may be grooved, or grooved pulleys placed thereon, and cords or belts D' working over guide-pulleys E, at the opposite end, placed thereon, which cords may be also connected at their ends to the slide C.

By means of this slide being moved back and forth on the said longitudinal bars by the hand, rotary motion may be communicated to the brush alternately in both directions, and the apparatus may be at the same time presented to the horse or other animal, and a brushing-action produced thereon.

I find a good result arising from the frequent changes in the direction of motion of the brush, in respect of cleaning the same by means of a scraper, F, so attached to the frame that it may be adjusted to or from the brush, and may be moved out of the way when combs are substituted for the brushes, the said reversed movements affording a better opportunity for the scraper to remove the hair and other matter adhering to the brush, as will be readily understood.

G represents a rest or gauge, for resting on the body of the animal, to govern the pressure of the brush.

Having thus described my invention,

I claim as new, and desire to secure by Letters Patent—

1. The combination, in a frame, of a rotary brush, and a slide arranged for communicating rotary motion to the brush, alternately in one direction and the other, as and for the purpose described.

2. The brush D, arranged in combination with the frame A, so as to be readily attached to and detached therefrom, substantially as and for the purpose described.

3. The combination, with the brush D, of the adjustable scraper F, substantially as and for the purpose described.

4. The arrangement of the brush D, frame A, pulleys E, cords D', and slide C, all substantially as and for the purpose described.

The above specification of my invention signed by me, this 24th day of September, 1868.

W. W. McKAY.

Witnesses:
J. D. McKay,
M. J. McKay.